(12) United States Patent
Lee et al.

(10) Patent No.: US 11,316,772 B2
(45) Date of Patent: Apr. 26, 2022

(54) NETWORK CONNECTED DEVICE AND TRAFFIC ESTIMATION METHOD THEREOF

(71) Applicant: Far EasTone Telecommunications Co., Ltd., Taipei (TW)

(72) Inventors: Yuan-Hung Lee, Taipei (TW); Meng-Ying Tsai, Taipei (TW)

(73) Assignee: Far EasTone Telecommunications Co., Ltd., Taipei (TW)

( * ) Notice: Subject to any disclaimer, the term of this patent is extended or adjusted under 35 U.S.C. 154(b) by 0 days.

(21) Appl. No.: 16/891,083

(22) Filed: Jun. 3, 2020

(65) Prior Publication Data

US 2020/0403898 A1    Dec. 24, 2020

Related U.S. Application Data

(60) Provisional application No. 62/864,507, filed on Jun. 21, 2019.

(30) Foreign Application Priority Data

Nov. 22, 2019    (TW) ................. 108142511

(51) Int. Cl.
| | |
|---|---|
| G06F 15/173 | (2006.01) |
| H04L 43/50 | (2022.01) |
| H04L 43/0894 | (2022.01) |
| G06K 9/62 | (2022.01) |
| H04L 43/067 | (2022.01) |
| H04L 43/04 | (2022.01) |
| H04L 43/062 | (2022.01) |
| G06N 20/00 | (2019.01) |

(52) U.S. Cl.
CPC ............ *H04L 43/50* (2013.01); *G06K 9/6256* (2013.01); *G06N 20/00* (2019.01); *H04L 43/04* (2013.01); *H04L 43/062* (2013.01); *H04L 43/067* (2013.01); *H04L 43/0894* (2013.01)

(58) Field of Classification Search
None
See application file for complete search history.

(56) References Cited

U.S. PATENT DOCUMENTS

| | | | |
|---|---|---|---|
| 7,558,865 B2 | 7/2009 | Lin et al. | |
| 8,930,294 B2 | 1/2015 | Anandaraj | |
| 10,277,476 B2 | 4/2019 | Mermoud et al. | |
| 2018/0124020 A1* | 5/2018 | Rodriguez | G06N 20/00 |
| 2018/0278543 A1* | 9/2018 | Gopalan | H04L 45/22 |
| 2019/0313168 A1* | 10/2019 | Eira | H04Q 11/0062 |

(Continued)

*Primary Examiner* — Brian Whipple
*Assistant Examiner* — Gregory P Tolchinsky
(74) *Attorney, Agent, or Firm* — JCIPRNET (57) ABSTRACT

Embodiments of the disclosure provide a network connected device and a traffic estimation method of the network connected device. In the method, a plurality of network packets are captured, a quantity of query times for at least one domain name in the network packets is counted, and network traffic of each network layer or each service type is determined according to the quantity of query times. In addition, according to the embodiments of the disclosure, a corresponding type feature is generated for a user based on a domain name query record. In this way, the Internet experience of the user may be improved based on the estimated result.

8 Claims, 4 Drawing Sheets

(56) References Cited

U.S. PATENT DOCUMENTS

2019/0318371 A1* 10/2019 Oruganti ............. G06F 16/9577
2019/0319881 A1* 10/2019 Maskara ............. H04L 41/0896
2020/0296023 A1*  9/2020 Kumar ................ H04L 43/0894

* cited by examiner

NETWORK CONNECTED DEVICE AND TRAFFIC ESTIMATION METHOD THEREOF

CROSS-REFERENCE TO RELATED APPLICATION

This application claims the priority benefits of U.S. provisional application Ser. No. 62/864,507, filed on Jun. 21, 2019 and Taiwan application serial no. 108142511, filed on Nov. 22, 2019. The entirety of each of the above-mentioned patent applications is hereby incorporated by reference herein and made a part of this specification.

BACKGROUND

Technical Field

The disclosure relates to a network management technology, and in particular, to a network connected device and a traffic estimation method thereof.

Description of Related Art

Nowadays, almost every person has devices (for example, a mobile phone, a tablet computer, a notebook computer, a smart watch, a smart home appliance, and so on) that may be connected to the Internet through a mobile network or another wireless network or wired network. With the diversified development of network application services (e.g., social media, streaming media, on-line games, and digital education), the quantity of users of network operators and the usage amount grow exponentially. To provide better Internet experience to the users, the operators positively increase or upgrade hardware equipment. In addition to the update in hardware, the operators also allocate network resources through network management. However, different users have different requirements for the application services. Therefore, how to provide suitable network management, equipment deployment, and software and hardware allocation for the users, companies, governments, or enterprises is one of the targets for which the operators strive.

SUMMARY

In view of this, embodiments of the disclosure provide a network connected device and a traffic estimation method thereof to obtain network traffic based on a domain name query and estimate a service-using behavior of a user accordingly, so as to further adjust equipment deployment and software and hardware allocation based on an analysis result.

In an embodiment of the disclosure, a traffic estimation method is provided, and the method includes following steps. A plurality of network packets are captured, a quantity of query times for at least one domain name in the network packets is counted, and network traffic is determined according to the quantity of query times.

In an embodiment of the disclosure, a network connected device is provided, and the network connected device includes, but is not limited to, a communications transceiver and a processor. The communications transceiver is configured to receive a plurality of network packets. The processor is coupled to the communications transceiver. The processor captures the network packets, counts a quantity of query times for at least one domain name in the network packets, and determines network traffic according to the quantity of query times.

Based on the above, in the network connected device and the traffic estimation method thereof as provided in one or more embodiments of the disclosure, the network traffic is estimated by analyzing domain name queries, and common or potential network service application types to which a user belongs are estimated. The traffic and user feature estimation may be used by network operators to subsequently provide better planning for equipment deployment, resource allocation, and management configuration and to further improve the Internet experience of the user.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate embodiments of the disclosure and together with the description serve to explain the principles of the disclosure.

DESCRIPTION OF THE EMBODIMENTS

Figure 1:
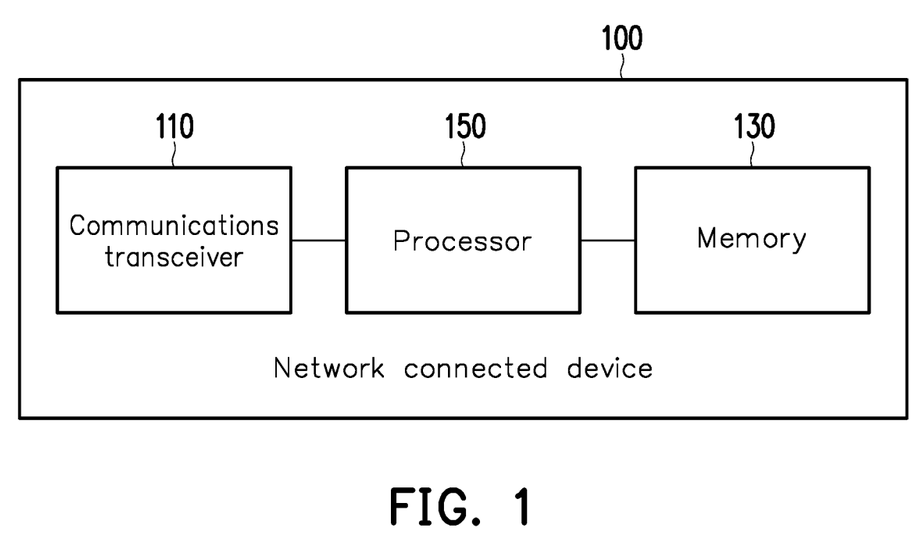
FIG. 1 is a block diagram of a network connected device according to an embodiment of the disclosure.

FIG. 1 is a block diagram of a network connected device 100 according to an embodiment of the disclosure. With reference to FIG. 1, the network connected device 100 includes, but not limited to, a communications transceiver 110, a memory 130, and a processor 150. The network connected device 100 may be a computer, a smartphone, a tablet computer, a server, a router, a switch, telecommunications equipment, or another electronic device.

The communications transceiver 110 may be a communications transceiver supporting the fourth generation (4G) or other generations of mobile communication, Wi-Fi, an Ethernet, a fiber-optic network, and the like, or may be a universal serial bus (USB), Thunderbolt, or another communication transmission interface. In the embodiment of the disclosure, the communications transceiver 110 is configured to receive a network packet. The network packet is a data unit transmitted in a network.

The memory 130 may be a fixed or removable random access memory (RAM) in any form, a read-only memory (ROM), a flash memory, a traditional hard disk drive (HDD), a solid-state drive (SSD) or a similar element, or a memory of a combination of the above elements. In the embodiment of the disclosure, the memory 130 is configured to store temporary or permanent data (for example, a training sample, an estimation model, a traffic contribution coefficient, and a network service application type), a network packet, a software module, or other files, and detailed content thereof is described in the subsequent embodiments.

The processor 150 is coupled to the communications transceiver 110 and the memory 130, and the processor 150 may be a central processing unit (CPU), or another programmable general-purpose or special-purpose microprocessor, a digital signal processor (DSP), a programmable controller, an application-specific integrated circuit (ASIC)

or other similar elements, or a combination of the above elements. In the embodiment of the disclosure, the processor 150 is configured to perform all works of the network connected device 100, and may be loaded and perform software modules, files, and data recorded in the memory 130.

Figure 2:
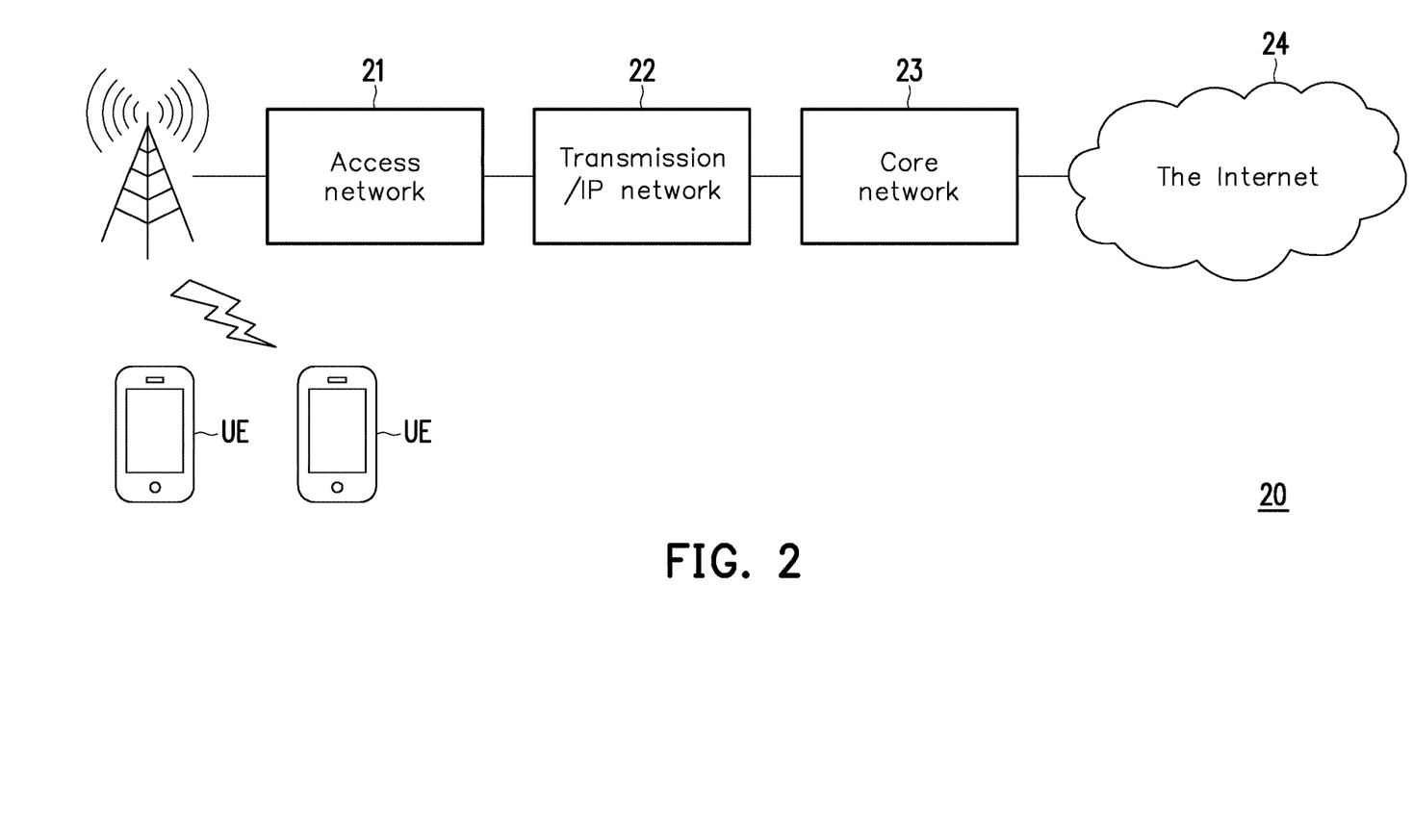
FIG. 2 is a schematic diagram of a communications system according to an embodiment of the disclosure.

It should be noted that, the network connected device 100 may be disposed in any network. For example, FIG. 2 is a schematic diagram of a communications system 20 according to an embodiment of the disclosure. With reference to FIG. 2, assuming that the communications system 20 belongs to the third generation (3G), 4G or other generations of mobile communication networks. The communications system 20 may include user equipment UE, a base station BS, an access network 21, a transmission/Internet protocol (IP) network 22, a core network 23, and the Internet 24. According to actual requirements, the network connected device 100 may be disposed in the transmission/IP network 22, the core network 23, or a wireless network formed by the user equipment UE and the base station BS. Namely, the network connected device 100 is a network node (which may be an input or output gateway between two networks, or a node disposed on a specific routing path) in a network to which the network connected device 100 belongs.

It should be noted that, in other embodiments, according to different system architectures, the wireless network in FIG. 2 may also be replaced with a Wi-Fi wireless network, or replaced with a wired Ethernet, a digital subscriber line (DSL), a fiber-optic network, or a cable network, and equipment in the access network 21, the transmission/IP network 22, and/or the core network 23 may also be changed correspondingly, which is not limited in the disclosure.

For ease of understanding the operation processes of the embodiments of the disclosure, the estimation method of the network connected device 100 for network traffic in the embodiments of the disclosure is described in detail below with reference to several embodiments. The method in the embodiments of the disclosure is descried below together with the elements and modules in the network connected device 100. The processes of the method may be adjusted according to actual situations, and are not limited thereto.

Figure 3:
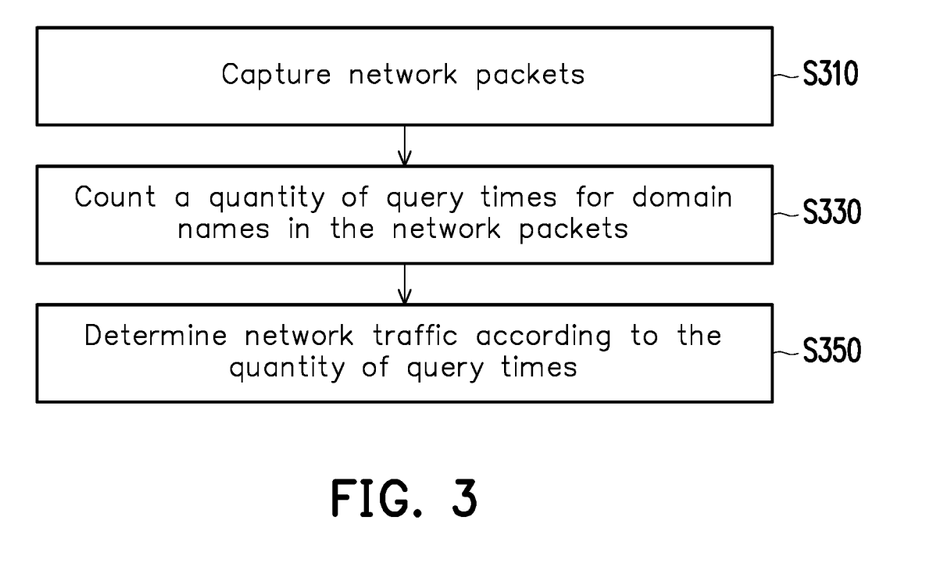
FIG. 3 is a flowchart of a traffic estimation method according to an embodiment of the disclosure.

FIG. 3 is a flowchart of a traffic estimation method according to an embodiment of the disclosure. With reference FIG. 3, the processor 150 captures network packets with use of the communications transceiver 110 (step S310). Specifically, the processor 150 may capture the network packets through Wireshark, tcpdump, SmartSniff, libpcap, winpcap, or a similar software or program library, and further parse the received network packets. In an embodiment, the processor 150 at least has a function of parsing a domain name system DNS) query/quest, or a DNS related packet, and may acquire a domain name (and/or a corresponding IP address) to be queried in the DNS related packet.

For example, Table (1) is an example for describing packet parsing results for DNS queries:

TABLE (1)

| Timestamp | Domain name |
|---|---|
| 4/2 04:44:00 | www.youtube.com |
| 4/2 04:44:01 | tw.linkedlin.com |
| 4/2 04:44:03 | onedrive.live.com |
| 4/2 04:44:03 | www.facebook.com |
| 4/2 04:44:06 | www.bing.com |
| 4/2 04:44:10 | www.youtube.com |
| 4/2 04:44:11 | tw.linkedlin.com |

TABLE (1)-continued

| Timestamp | Domain name |
|---|---|
| 4/2 04:44:13 | onedrive.live.com |
| 4/2 04:44:13 | www.facebook.com |
| 4/2 04:44:16 | www.bing.com |
| 4/2 04:44:20 | www.youtube.com |
| 4/2 04:44:21 | tw.linkedlin.com |
| 4/2 04:44:23 | onedrive.live.com |
| 4/2 04:44:23 | www.facebook.com |
| 4/2 04:44:26 | www.bing.com |
| 4/2 04:44:30 | www.youtube.com |
| 4/2 04:44:31 | tw.linkedlin.com |

It should be noted that, according to the network to which the network connected device 100 belongs, a quantity of nodes that may be monitored by the network connected device 100 may reach up to tens of thousands, or may be less than 10, but the embodiments of the disclosure do not limit the quantity of the monitored nodes.

Next, the processor 150 counts a quantity of query times for one or more domain names in the network packets (step S330). In an embodiment, the processor 150 may set, according to requirements, specific duration (for example, 5, 15, or 30 minutes) and/or a frequency (for example, once every day, three times every week, or 10 times every month) for monitoring the network packets (for example, from the user equipment UE), which is not limited in the disclosure. The processor 150 may further add up quantities of DNS queries for the domain names in a counting time (for example, 15 minutes, one day, or one month), to respectively obtain the quantities of queries for the domain names.

For example, Table (2) is an example for describing statistical results for DNS queries:

TABLE (2)

| Domain name | Quantity of query times in 15 minutes |
|---|---|
| www.youtube.com | 100 |
| tw.linkedin.com | 500 |
| onedrive.live.com | 100 |
| www.facebook.com | 20 |
| www.bing.com | 1000 |

Next, the processor 150 determines network traffic according to the quantity of query times (step S350). Specifically, in an initial phase of most network behaviors, a user terminal sends a DNS query to obtain a corresponding network address, and is further linked to a remote server or another electronic device according to the network address. A domain, a website, or even a network service to be accessed by the user terminal may be learned from the DNS query. For example, www.facebook.com is a social media service, and www.youtube.com is a video streaming service. In addition, according to an experiment or a data statistical result, different network services may correspond to different network traffic. Based on the above relationships, in the embodiments of the disclosure, a correspondence between a domain name query and network traffic is applied to estimate the network traffic for monitoring a node or a group.

In an embodiment, in the disclosure, the effect of the highly accurate inference of an artificial intelligence (AI) technology, and a machine learning technology (for example, an artificial neural network (ANN) of AI, a decision tree, or a support vector machine (SVM)) are used to decide the estimation for the network traffic. The processor 150 may take a plurality of historical network packets (which represent network packets received in a period of time past) and actual traffic thereof as a plurality of training samples. Likewise or similarly, the processor 150 parses and counts a quantity of query times for domain names in the historical network packets, and collect statistics of actual traffic corresponding to the domain names (the sum of network packets received and/or transmitted from specific domain names). The processor 150 uses the training samples (namely, a training set) based on the machine learning technology to train an estimation model. For example, the processor 150 obtains the estimation model through steps such as error function defining, feature extraction, difference minimization, and classified generating. The processor 150 may input the quantity of query times for the domain names counted in step S330 to the estimation model, to obtain the corresponding network traffic.

Figure 4:
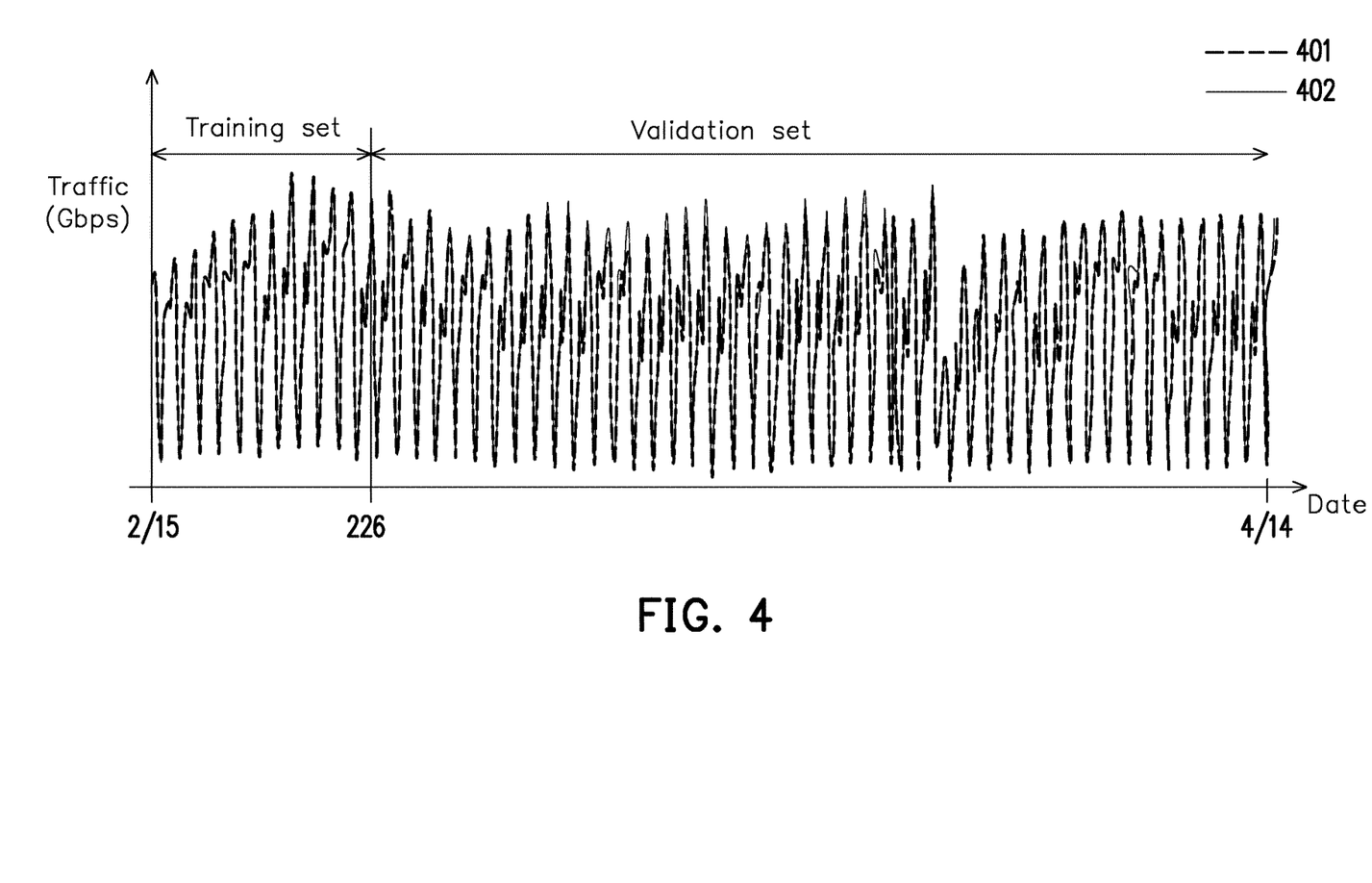
FIG. 4 is a comparison diagram illustrating an example of actual network traffic and estimated network traffic.

FIG. 4 is a comparison diagram illustrating an example of actual network traffic and estimated network traffic. With reference to FIG. 4, it is assumed that the estimation model is for 68 domain names. A quantity of query times counted from February 15 to February 26 and corresponding actual traffic are used as a training set, and a quantity of query times counted from February 26 to April 14 is used as an input of a validation set. It can be learned from FIG. 4 that, estimation traffic 401 obtained through the estimation model almost overlaps actual traffic 402. The accuracy of the training set is almost 100%, and the accuracy of the validation set may reach up to 97% (the value may change, which is not limited in the disclosure). Therefore, it can be learned that, the existing machine learning algorithm may have already provided extremely high inference accuracy.

It should be noted that, in other embodiments, the processor 150 may also obtain the correspondence between the quantity of query times and the network traffic based on algorithms such as arithmetic average and inferential statistics, and estimate the network traffic according to the correspondence.

In an embodiment, the processor 150 may obtain a traffic contribution coefficient of each domain name. The traffic contribution coefficient is traffic corresponding to one query for the domain name. The processor 150 may obtain the traffic contribution coefficient based on machine learning or other algorithms. For example, a quantity of query times for a specific domain name is set to once, and network traffic is obtained based on the above correspondence. It should be noted that, the quantity of query times may also be set to more than once, but a standardized computation needs to be performed on traffic contribution coefficients of all domain names. Next, the processor 150 may respectively determine, according to the traffic contribution coefficients of the domain names, the network traffic corresponding to the quantity of query times for each domain name. For example, the processor 150 uses a result obtained by multiplying the quantity of query times by the corresponding traffic contribution coefficient as the estimated network traffic. It should be noted that, in some embodiments, the above algorithm may give weights and bias according to requirements or may be different in consideration with other parameters.

For example, Table (3) is an example for describing statistical data of network services:

| Domain | Service | Quantity of query times |
|---|---|---|
| .i9.ytime.com | YouTube | 6871 |
| .apps-mzstatic-cdn-itunes-apple.com.akadns.net | iTunes | 1356 |
| .r2---sn-45gx5unvox-u2xee.googlevideo.com | YouTube | 4110 |
| .doc.google.com | Google Docs | 4614 |
| .accounts.google.com | Google Account | 19869 |
| .r1—sn-45gx5nuvox-u2xee.googlevideo.com | YouTube | 4409 |

The estimated network traffic is the product of the traffic contribution coefficient multiplied by the quantity of query times.

According to different disposing positions of the network connected device 100, the network packets received in step S310 may flow through an access network, a transmission network, or a core network. In an embodiment, the processor 150 may determine the network traffic flowing through the access network, the transmission network, or the core network (which represents total network traffic in the network) according to the network traffic corresponding to all domain names. For example, if the network connected device 100 is in the core network, the processor 150 may add up the network traffic corresponding to all domain names, to represent the total network traffic of the core network. It should be noted that, according to different requirements, the network traffic of the specific domain name may give weights or bias. Based on the estimated result, operators may estimate whether equipment deployment or management configuration of the network is suitable or sufficient.

In some embodiments, the processor 150 further estimates traffic of a network node according to a routing policy.

In another embodiment, the processor 150 may set several network service application types. For example, the network service application type may be video streaming, social media, an on-line game, a shopping website, or a specific network service name (for example, YouTube, Tik Tok, or Taobao). Each domain name may correspond to one or more network service application types. For example, Facebook may correspond to types such as social media, live streaming, and shopping. The processor 150 may determine, according to quantities of query times of one or more users (corresponding to the user equipment UE) for the domain names, corresponding network traffic of using use the network service application types by the one or more users. Namely, a network service orientation is used to analyze the network traffic of the network service application types, for example, the total traffic of the YouTube service in Table (3). Because the quantity of query times and/or the amount of the network traffic may reflect the preference or frequency of a user of a specific usage type, the processor 150 may further determine the network service application type to which the user belongs according to the corresponding network traffic of each network service application type. There may be one or more network service application types to which the user belongs. The processor 150 may generate labels of type features for users, for example, labels such as videos, shopping, and games, according to type analysis results. Table (3) is taken as an example, and the product of all traffic and weights of YouTube has the highest proportion, so that the processor 150 determines that the label of the user is a video user. Based on the estimated result, operators may additionally provide a proxy or cache server for users of different labels to improve the Internet experience of specific service types.

Based on the above, in the network connected device and the traffic estimation method thereof in the embodiments of the disclosure, in each network layer, a correspondence between a domain name query and network traffic of an application service is precisely estimated, and may be further applied to a core network or a transmission/IP network, to further access a wireless/wired network. Service traffic of each network layer can be instantly (or almost instantly) estimated, and network node traffic can be estimated. On the other hand, type features are automatically generated for users based on a domain query record, and labels matching the users are obtained accordingly, to understand service requirements of the users. In this way, software and hardware management planning in a system architecture can be further improved based on the estimated result, to further improve the Internet experience of the users.

Although the disclosure is described with reference to the above embodiments, the embodiments are not intended to limit the disclosure. A person of ordinary skill in the art may make variations and modifications without departing from the spirit and scope of the disclosure. Therefore, the protection scope of the disclosure should be subject to the appended claims.

What is claimed is:

1. A traffic estimation method, comprising:
capturing a plurality of network packets;
counting a quantity of query times for at least one domain name in the network packets, wherein the step of counting the quantity of query times for the at least one domain name in the network packets comprises:
    parsing the at least one domain name to be queried in the network packets; and
    adding up quantities of domain name system queries for each of the at least one domain name respectively to obtain the quantity of query times; and
determining network traffic according to the quantity of query times, wherein the step of determining the network traffic according to the quantity of query times comprises:
taking a plurality of historical network packets and corresponding actual traffic as a plurality of training samples;
training an estimation model with use of the training samples based on a machine learning technology, wherein the estimation model is obtained through feature extraction, wherein labels of type features are generated by the feature extraction based on a domain query record; and
inputting the quantity of query times to the estimation model to obtain the network traffic.

2. The traffic estimation method according to claim 1, wherein the step of determining the network traffic according to the quantity of query times comprises:
acquiring a traffic contribution coefficient of each of the at least one domain name, wherein the traffic contribution coefficient is traffic corresponding to one query for the at least one domain name; and
respectively determining, according to the traffic contribution coefficient of the at least one domain name, the network traffic corresponding to the quantity of query times for each of the at least one domain name.

3. The traffic estimation method according to claim 1 or 2, wherein the network packets flow through one of an access network, a transmission network, and a core network, and the step of determining the network traffic according to the quantity of query times comprises:
determining the network traffic flowing through the access network, the transmission network, or the core network according to the network traffic corresponding to all of the at least one domain name.

4. The traffic estimation method according to claim 1 or 2, wherein the step of determining the network traffic according to the quantity of query times comprises:
setting a plurality of network service application types, wherein each of the at least one domain name at least corresponds to one of the network service application types;
determining, according to the quantity of query times of a user for the at least one domain name, corresponding network traffic of using each of the network service application types by the user; and
determining, according to the corresponding network traffic of each of the network service application types, one of the network service application types to which the user belongs.

5. A network connected device, comprising:
a communications transceiver, receiving a plurality of network packets; and
a processor, coupled to the communications transceiver and configured to:
capture the network packets;
count a quantity of query times for at least one domain name in the network packets, wherein the processor is further configured to:
    parse the at least one domain name to be queried in the network packets; and
    add up quantities of domain name system queries for each of the at least one domain name respectively to obtain the quantity of query times;
determine network traffic according to the quantity of query times;
take a plurality of historical network packets and corresponding actual traffic as a plurality of training samples;
train an estimation model with use of the training samples based on a machine learning technology, wherein the estimation model is obtained through feature extraction, wherein labels of type features are generated by the feature extraction based on a domain query record; and
input the quantity of query times to the estimation model to obtain the network traffic.

6. The network connected device according to claim 5, wherein the processor is configured to:
acquire a traffic contribution coefficient of each of the at least one domain name, wherein the traffic contribution coefficient is traffic corresponding to one query for the at least one domain name; and
respectively determine, according to the traffic contribution coefficient of the at least one domain name, the network traffic corresponding to the quantity of query times for each of the at least one domain name.

7. The network connected device according to claim 5 or 6, wherein the network packets flow through one of an access network, a transmission network, and a core network, and the processor is configured to:
determine the network traffic flowing through the access network, the transmission network, or the core network according to the network traffic corresponding to all of the at least one domain name.

8. The network connected device according to claim 5 or 6, wherein the processor is configured to:
   set a plurality of network service application types, wherein each of the at least one domain name at least corresponds to one of the network service application types;
   determine, according to the quantity of query times of a user for the at least one domain name, corresponding network traffic of using each of the network service application types by the user; and
   determine, according to the corresponding network traffic of each of the network service application types, one of the network service application types to which the user belongs.

* * * * *